March 3, 1964     D. J. LEMENS     3,123,741
PROTECTIVE MEANS FOR SHUNT CAPACITOR BANK
Filed July 21, 1961     2 Sheets-Sheet 1
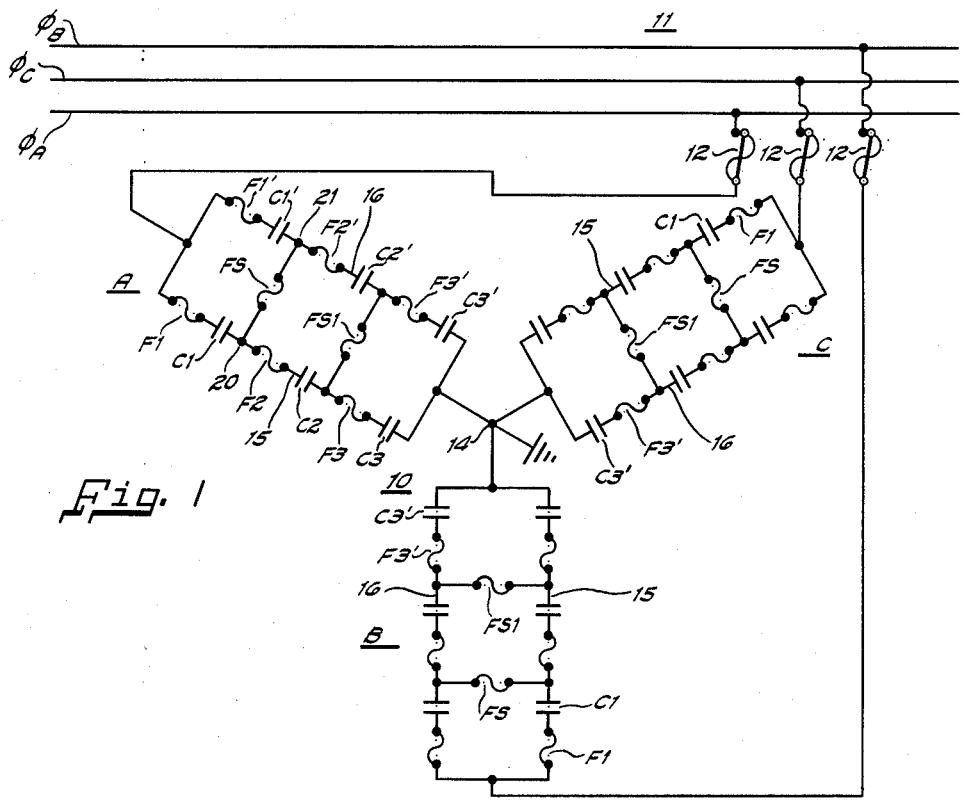
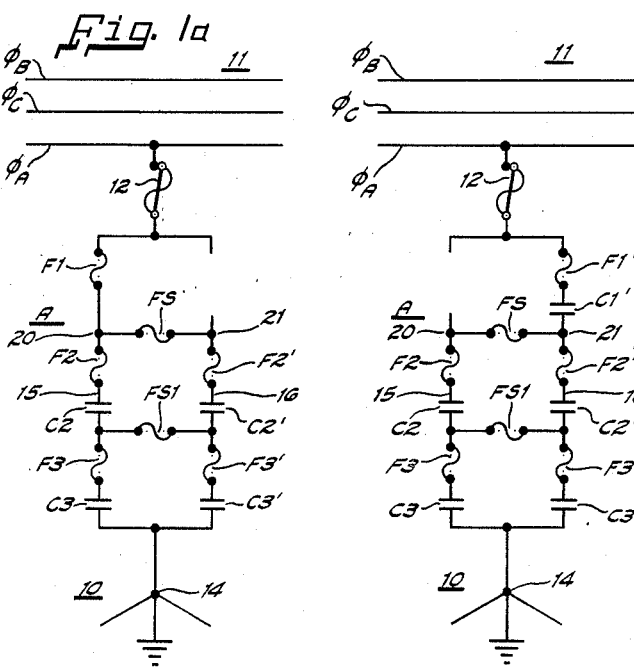
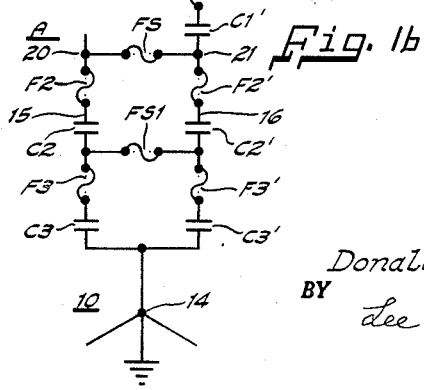
INVENTOR.
Donald J. Lemens
BY Lee H. Kaiser
Attorney March 3, 1964 D. J. LEMENS 3,123,741
PROTECTIVE MEANS FOR SHUNT CAPACITOR BANK
Filed July 21, 1961 2 Sheets-Sheet 2
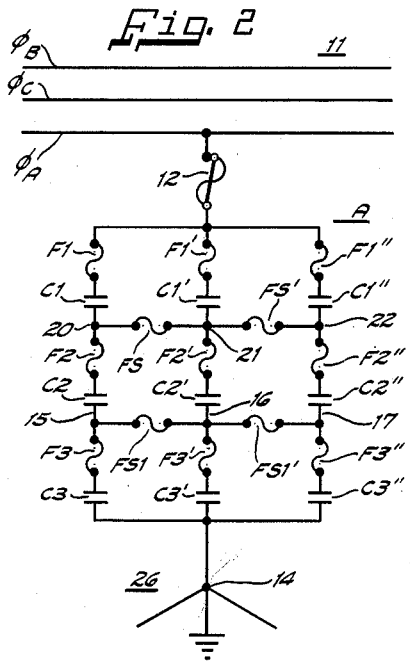
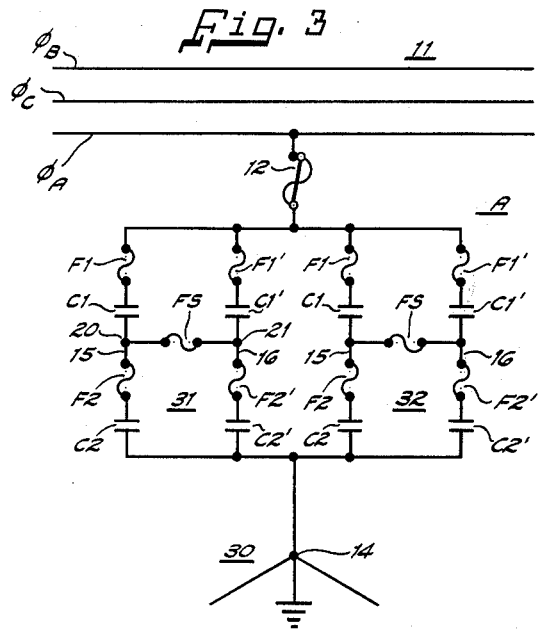
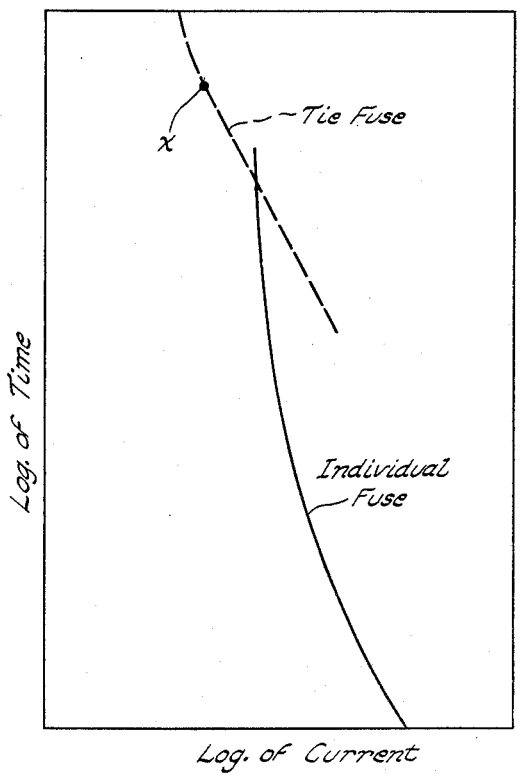
INVENTOR.
Donald J. Lemens
BY
Lee H. Kaiser
Attorney

United States Patent Office 3,123,741
Patented Mar. 3, 1964

3,123,741
PROTECTIVE MEANS FOR SHUNT CAPACITOR
BANK
Donald J. Lemens, South Milwaukee, Wis., assignor to McGraw-Edison Company, Milwaukee, Wis., a corporation of Delaware
Filed July 21, 1961, Ser. No. 125,720
5 Claims. (Cl. 317—12)

This invention relates to shunt capacitor banks for alternating current power systems and, more particularly, to the protection of shunt capacitor banks against damage resulting from capacitor unit failure.

Standard capacitor units for power factor correction or voltage improvement on electric power distribution systems cannot safely be subjected to continuous overvoltage in excess of 10% of the rated voltage, and when sufficient capacitor failures have occurred in a series group of a shunt capacitor bank to cause the voltage on the remaining units to exceed 110% of the rated voltage, industry standards recommend that the bank be removed from the power system and the failed units replaced. In order to provide satisfactory protection against overvoltage caused by capacitor unit failure, it is generally recommended that a certain minimum size bank be adhered to. This minimum size bank is based, among other reasons, on the premise that one capacitor unit in any series group may fail without causing an overvoltage in excess of 10% of rated voltage on the remaining units of that series group, and it is the practice in the industry to limit such overvoltage on the remaining units to less than 10% of rated voltage by utilizing a minimum predetermined number of capacitor units in parallel in each series group. However, this requirement of a minimum number of capacitor units per series group often necessitates a capacitor bank of greater kilovar capacity than required to provide the desired power factor correction or voltage improvement.

When the number of paralleled capacitor units in each series group is less than such predetermined minimum number, protective means must be provided to disconnect the capacitor bank from the power system upon operation of an individual fuse in order to prevent damage to the remaining units. Elaborate unbalance detection protective means utilizing expensive circuit breakers are available for this purpose, but they cannot be economically justified if the kilovar size of the capacitor bank is small. The trend in electrical power distribution systems is toward higher voltages, and such unbalance detecting protective means utilizing circuit breakers are not economically feasible on small kilovar size capacitor banks used on relatively high voltage electric power distribution systems, for example, on 20.0/34.5 kilovolt circuits, which are coming into ever-increasing use.

Commercially available capacitor units are manufactured in standard relatively low voltage ratings, for example, 2400, 2770, 4160, 4800, 6640, 7200, 7620, and 7960 volts, and it is common practice to connect such standard voltage capacitor units in series groups of paralleled capacitor units to obtain the desired voltage and kilovar rating for use on relatively high voltage distribution circuits and to use a group fuse for protection. One disadvantage of such protective arrangement is that the increase in the line current, resulting from the failure of a single capacitor unit, may not be of sufficient magnitude to cause the group fuse to rupture. Consequently, failure of a single capacitor unit in such a capacitor bank protected only by group fuses may result in continued arcing in the faulty unit and harmful overvoltages on the capacitor units of other series groups.

It is an object of the invention to provide completely protected shunt capacitor banks for alternating current power systems in smaller kilovar sizes than heretofore recommended by industry standards.

It is a further object of the invention to provide shunt capacitor bank protective means which will permit use of fewer paralleled capacitor units per series group than the number followed by industry practice and which does not require elaborate unbalance detecting means and costly circuit breakers.

Another object of the invention is to provide shunt capacitor bank protective means for relatively high voltage electric power distribution systems which will allow use of fewer paralleled capacitor units per series group than the number followed by industry practice and will also permit a portion of the bank to continue to deliver reactive volt-amperes to the system after failure of a single capacitor unit without subjecting the energized capacitor units to damaging overvoltage.

It is a still further object of the invention to provide multiple-series shunt capacitor bank protective means utilizing fuses only which will permit fewer parallel capacitor units per series group than the number followed by industry practice without causing damage from overvoltage, in the event of capacitor unit failure, to the remaining capacitor units in the bank.

These and other objects and advantages of the invention will be more readily apparent from the following description when taken in conjunction with the accompanying drawing wherein:

FIG. 1 is a circuit diagram of a three phase shunt capacitor bank embodying the invention;

FIG. 1a schematically illustrates the circuit condition after failure of a single unit;

FIG. 1b schematically illustrates the circuit condition after the individual fuse associated with the failed unit has operated;

FIG. 2 is a circuit diagram of one phase of a polyphase capacitor bank embodying the invention having three paralleled capacitor units in each series group;

FIG. 3 is a circuit diagram of the shunt capacitor bank protective means of the invention embodied in a bank of relatively large kilovar size; and FIG. 4 illustrates typical time-current characteristics for the individual fuses and tie fuses utilized in the embodiment of FIG. 1.

When the fuse blows on a capacitor unit of a shunt capacitor bank having series groups of parallel capacitor units, the impedance of the series group containing the faulted capacitor increases so that the voltage across this series group increases while it decreases across other series groups. Standard power factor correction capacitor units cannot safely be subjected to a continuous overvoltage of more than 10% of rated voltage, it is industry practice to provide a sufficient number of parallel capacitor units in each series group so that one capacitor unit can be removed without causing an overvoltage in excess of 10% of rated voltage on the remaining capacitors. This practice permits operation of the capacitor banks without damage to the capacitor units even though a single capacitor unit in any series group has failed or been removed, but such construction requires a predetermined minimum number of capacitor units to be included in the bank which may necessitate greater kilovar capacity for the bank than necessary to provide the desired power factor correction or voltage improvement.

Elaborate unbalance detecting protective means utilizing expensive circuit breakers can be utilized to disconnect a bank having less than such predetermined minimum number of units if a single capacitor unit fails and its individual fuse ruptures, but such protective means cannot be economically justified on small kilovar size capacitor banks used on high voltage electric power distribution systems. The invention permits protection of multiple-series shunt capacitor banks in smaller kilovar sizes than heretofore recommended by industry standards using fuses only and without costly unbalance detecting protective means utilizing circuit breakers to disconnect the bank from the power system.

The word "capacitor" as used in the appended claims is intended to cover either a single capacitor unit or a plurality of paralleled capacitor units protected by a single fuse.

The invention is illustrated in FIG. 1 embodied in a three phase, multiple-series, grounded neutral shunt capacitor bank 10 connected to a three phase, high voltage, electric power distribution system 11 which may be of 20.0/34.5 kilovolt rating. The phases A, B, and C of capacitor bank 10 are connected to the phase conductors $\phi_A$, $\phi_B$, and $\phi_C$ respectively of power system 11 through fuse cutouts 12 which provide protection for the power system 11 and remove the capacitor bank 10 from the power system in the event that a line-to-ground, line-to-line, or three phase fault should occur on the capacitor bank 10.

The phases A, B, and C of capacitor bank 10 are identical and only phase A will be described. Phase A includes two similar parallel branches 15 and 16 each of which has three serially connected standard capacitor units, preferably of 15 kilovolt rating. The branches 15 and 16 are identical, and elements in branch 16 are given the same reference numerals as like elements in branch 15 with the addition of the prime (') designation. Branch 15 includes capacitors C1, C2, and C3 having individual fuses F1, F2, and F3 respectively in series therewith. Branch 16 similarly includes capacitors C1', C2', and C3' with individual fuses F1', F2', and F3' respectively in series therewith. Corresponding capacitor units in the two similar branches 15 and 16, i.e. the capacitor units of the series groups, are connected in parallel by current sensitive circuit interrupting means such as tie fuses FS and FS1 between normally equipotential points in the branches 15 and 16 at the junctures between series connected capacitor units. For example, tie fuse FS is connected between point 20 at the junction between capacitor unit C1 and fuse F2 in branch 15 and the equipotential point 21 in branch 16 at the juncture between capacitor C1' and fuse F2' to parallel the capacitor units C1 and C1' of the series group of phase A adjacent to power line conductor $\phi_A$.

In order to better understand the operation of the invention, assume that a terminal-to-terminal fault has occurred in capacitor unit C1. As a consequence, the impedance of phase A will decrease and capacitor unit C1 will be effectively short circuited. This circuit condition is schematically represented in FIG. 1a. The line current through phase A and individual fuse F1 will accordingly increase to 150% of normal, whereas tie fuse FS carries only one half of this magnitude of current. Such increase in current will be sufficient to rupture fuse F1 and remove the failed capacitor unit C1 from the power system. Voltage will then be restored across capacitor unit C1', and such circuit condition is schematically represented in FIG. 1b from which it will be evident that the line-to-neutral voltage will be unequally divided across the series groups and that the capacitor unit C1' will be subjected to an overvoltage of 150% of rated voltage. Capacitor unit C1' can withstand this magnitude of overvoltage for a short period of time without damage as indicated by its permissible time-overvoltage characteristic. Before capacitor unit C1' can be damaged by such overvoltage, tie fuses FS and FS1 rupture sequentially to disconnect capacitor units C2 and C3. Tie fuses FS and FS1 preferably are of the slow-to-operate, high-surge type having a relatively high speed ratio (defined a ratio between melting times at 0.1 second and 300 seconds) which operate over a relatively long period of time in response to a relatively small magnitude of current before the individual fuse operates. FIG. 4 illustrates typical time-current characteristics for the tie fuses and the individual fuses. It will be noted that the slope (negative) of the tie fuse is much more gradual than that of the individual fuse at higher time values, and the characteristics of the tie-fuses and individual fuses are selected so that in the current range to which a tie fuse is subjected, upon operation of an individual fuse, the tie fuse FS will operate before the individual fuse F1' even though the individual fuse F1' carries twice the magnitude of current as the tie fuse FS. For example, point X on the time-current characteristic of the tie fuse in FIG. 4 may be at the magnitude of current which tie fuse FS carries after individual fuse F1 operates, and it will be noted that individual fuse F1' will not operate even though it carries substantially higher currents than that at point X.

Removal of capacitors C2 and C3 from the power system results in equal distribution of the line-to-neutral voltage across the three series groups and restores normal voltage across capacitor C1'. With the neutral 14 of the capacitor bank 10 grounded, the line-to-neutral voltage will be divided equally across the series groups, and the capacitor units C1', C2', and C3' will operate normally to deliver reactive volt amperes to the power system 10. The phases A, B, and C of the capacitor bank 10 will be unbalanced with the result that current will flow from the capacitor bank neutral 14 to ground, and detection of the failed capacitor unit C1 can be accomplished by current sensitive indicating means connected between the capacitor bank neutral 14 and ground. For a floating neutral wye connected capacitor bank, such unbalance of the phases A, B, and C will result in shift of the neutral 14 and an overvoltage on the highest impedance phase containing the disconnected capacitor units, but the magnitude of this overvoltage will not seriously damage the connected capacitor units of this phase.

Assuming that a terminal-to-terminal fault occurs in capacitor unit C2, the increase in line current will rupture fuse F2 to remove the failed unit from the power system. The two tie fuses FS and FS1 will carry approximately the same magnitude of overcurrent and will rupture approximately simultaneously rather than sequentially as in the above example wherein a capacitor unit C1 in a series group adjacent one end of branch 15 failed.

A shunt capacitor bank having only two series groups can be protected in a similar manner using only a single tie fuse.

As illustrated in FIG. 2 a shunt capacitor bank 26 having more than two paralleled capacitor units in each series group can be protected by the invention. FIG. 2 shows only one phase A of a three phase capacitor bank 26 and is analogous to the embodiment of FIG. 1 in having a plurality of similar parallel branches 15, 16 and 17 each of which comprises three capacitor units C1, C2, and C3 connected in series and individual fuses F1, F2, and F3 respectively for the capacitor units C1, C2, and C3. The three branches 15, 16, and 17 are identical, and elements in branches 16 and 17 are given the same reference numerals as like elements in branch 15 with the prime (') and double prime (") designations respectively. Tie fuses are connected between equipotential points in the three similar branches 15, 16, and 17 at the junctures between series connected capacitors to parallel the capacitor units of the series groups. For example, tie fuse FS is connected between point 20 at the juncture between capacitor unit C1 and fuse F2 in branch 15 and point 21 at the juncture in branch 16 of capacitor unit C1' and fuse F2'. Similarly, tie fuse FS' is connected between point 21 in branch 16 at the juncture of capacitor C1' and fuse F2' and point 22 in branch 17 at the juncture between capacitor C1" and fuse F2". If the failed capacitor unit is in branch 15, only the tie fuses FS and FS1 need rupture in order to restore equal voltages across the three series groups. If the failed capacitor unit is in branch 17, only the tie fuses FS' and FS1' need rupture in order to restore equal voltages across the three series groups. If the failed capacitor unit is in the middle branch 16, all four tie fuses must blow in order to restore equal voltages across the three series groups and thus permit the energized capacitor units in branches 15 and 17 to function normally in providing reactive volt-amperes to the power system.

FIG. 3 illustrates one phase of a shunt capacitor bank 30 embodying the invention and which is of relatively large kilovar size in comparison to the bank 10 of the embodiment of FIG. 1. Capacitor bank 30 is essentially bank 10 repeated a plurality of times, and phase A thereof comprises a plurality of branch-pairs 31 and 32 connected between power line phase conductor $\phi_A$ and the neutral 14. Each branch-pair 31 and 32 includes a plurality of similar parallel branches 15 and 16. Each branch 15 and 16 has a plurality of capacitor units C1 and C2 in series with individual fuses F1 and F2. A tie fuse FS is connected between equipotential points 20 and 21 in the two branches 15 and 16 at the juncture between capacitor units C1 and C2 in branch 15 and units C1' and C2' in branch 16 to parallel the capacitor units in each series group. It will be noted that a capacitor bank 30 having only two series groups is protected in the embodiment of FIG. 3 by the shunt capacitor protective means of the invention.

Although the invention has been illustrated and described as utilizing fusible elements such as FS and FS1 between equipotential points in the parallel branches to connect the capacitor units of the series groups in parallel, it will be appreciated that the invention is not so limited and also comprehends the use of current sensitive circuit interrupters of the bimetal or thermal responsive type in place of the tie fuses to normally connect the capacitor units of each series group in parallel and to remove, from the power system, in the event of capacitor unit failure, the remaining units in the branch having the failed unit.

It will be apparent that the invention will permit construction of protected shunt capacitor banks of kilovar capacity considerably smaller than the minimum size required by industry practice without elaborate unbalance detecting means and expensive circuit breakers. Although only a few embodiments of the invention have been illustrated and described, many modifications and variations thereof will be obvious to those skilled in the art, and consequently it is intended in the appended claims to cover all such modifications and variations as fall within the true spirit and scope of the invention.

What I claim as new and desire to secure by Letters Patent of the United States is:

1. A capacitor bank including at least two similar parallel branches each of which has a plurality of capacitor units in series, individual fuses for said capacitor units, a group fuse for connecting said parallel branches in shunt to an alternating current line, and tie fuses between normally equipotential points in said branches at the junctures between adjacent series connected units connecting corresponding capacitor units in the two branches in parallel, said tie fuses being adapted to operate in response to unbalance current flow therethrough incident to operation of an individual fuse in one branch before the individual fuses in the other branch operate.

2. A series-parallel shunt capacitor bank including a plurality of series connected groups of capacitor units, group fuse means for connecting said bank in shunt to an alternating current line, individual fuses for said capacitor units, and tie fuses paralleling the capacitor units of said series groups, said tie fuses being adapted to operate in response to the flow of unbalance current therethrough incident to operation of an individual fuse before the remaining individual fuses operate.

3. A three phase wye capacitor bank having in each phase at least two similar parallel branches each of which includes at least two series connected capacitor units, a group fuse in each phase for connecting said parallel branches of said phase between one phase conductor of a three phase alternating current power system and the wye bank neutral, individual fuses for the capacitor units, and tie fuses between equipotential points in the two similar branches at the junctures between series connected units connecting corresponding units in the two similar branches in parallel, said tie fuses having a high speed ratio and being adapted to rupture in response to the flow of unbalance current therethrough incident to operation of an individual fuse in one branch before the individual fuses in the other branch operate.

4. A shunt capacitor bank including at least two similar parallel branches each of which has series connected capacitors, a plurality of fuse means in each said branch operable in response to a fault in one of said capacitors to interrupt the circuit to said one capacitor, group fuse means for connecting said parallel branches in shunt to an alternating current line, and current sensitive means normally connecting equipotential points in said branches at the junctures between said series connected capacitors to parallel the corresponding capacitors in said similar branches and being operable in response to the flow of a predetermined current therethrough incident to operation of one of said fuse means in one branch to interrupt the connection between said equipotential points before said fuse means in the other branch operate.

5. A three phase shunt capacitor bank having in each phase at least two similar parallel branches of series connected capacitors and means for connecting said parallel branches in shunt to a three phase alternating current system, a plurality of fuse means in each branch each of which is operable in response to a fault in one of said capacitors to remove said one capacitor from the power system, and tie fuses between normally equipotential points in said branches at the junctures between series connected capacitors connecting corresponding capacitors in said branches in parallel, said tie fuses having a high ratio between the melting time at 0.1 second and the melting time at 300 seconds and being adapted to operate in response to the flow of unbalance current therethrough incident to operation of a fuse means in one branch before the fuse means in the other branch operate.

References Cited in the file of this patent

UNITED STATES PATENTS

| | | |
|---|---|---|
| 2,447,658 | Marbury et al. | Aug. 24, 1948 |
| 2,550,119 | Marbury et al. | Apr. 24, 1951 |
| 2,888,613 | Cuttino | May 26, 1959 |
| 2,931,950 | Minder | Apr. 5, 1960 |